(12) United States Patent
Cameron et al.

(10) Patent No.: US 12,018,557 B2
(45) Date of Patent: Jun. 25, 2024

(54) GRAVEL PACK QUALITY MEASUREMENT

(71) Applicant: Chevron U.S.A. Inc., San Ramon, CA (US)

(72) Inventors: John Alasdair Cameron, Houston, TX (US); Alexei Olegovich Bolshakov, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 248 days.

(21) Appl. No.: 17/332,531

(22) Filed: May 27, 2021

(65) Prior Publication Data

US 2021/0372266 A1 Dec. 2, 2021

Related U.S. Application Data

(60) Provisional application No. 63/032,142, filed on May 29, 2020.

(51) Int. Cl.
| | | |
|---|---|---|
| *E21B 47/002* | (2012.01) | |
| *E21B 37/08* | (2006.01) | |
| *E21B 43/04* | (2006.01) | |
| *E21B 47/135* | (2012.01) | |
| *G01N 15/08* | (2006.01) | |

(52) U.S. Cl.
CPC .......... *E21B 47/0025* (2020.05); *E21B 37/08* (2013.01); *E21B 43/04* (2013.01); *E21B 47/135* (2020.05); *G01N 15/088* (2013.01); *E21B 2200/22* (2020.05)

(58) Field of Classification Search
CPC .... E21B 47/0025; E21B 47/135; E21B 43/04; G01N 15/088
See application file for complete search history.

(56) References Cited

U.S. PATENT DOCUMENTS

| | | | |
|---|---|---|---|
| 6,684,951 B2 | 2/2004 | Restarick et al. | |
| 7,100,690 B2 * | 9/2006 | Mullen | E21B 43/12 166/278 |
| 7,163,055 B2 * | 1/2007 | Coon | E21B 23/08 166/250.01 |
| 7,243,715 B2 * | 7/2007 | Wang | E21B 43/084 166/278 |
| 10,465,484 B2 * | 11/2019 | Turner | E21B 43/10 |
| 10,472,945 B2 * | 11/2019 | Richards | E21B 43/08 |
| 11,339,641 B2 * | 5/2022 | Richards | E21B 47/07 |

OTHER PUBLICATIONS

Acoustic Wave Technology Sensors, Bill Drafts, Oct. 1, 2000.*

\* cited by examiner

*Primary Examiner* — Nabil H Syed
*Assistant Examiner* — Cal J Eustaquio
(74) *Attorney, Agent, or Firm* — King & Spalding LLP (57) ABSTRACT

A system for measuring a porosity of a gravel pack in a wellbore includes a transmitting acoustic transducer attached to a sand screen and configured to transmit an acoustic signal. The system further includes multiple acoustic transducers attached to the sand screen and configured to receive the acoustic signal through the gravel pack. The system also includes a control device configured to receive electrical signals from the multiple acoustic transducers and determine the porosity of the gravel pack around the sand screen based on at least the electrical signals. The electrical signals are generated from the acoustic signal received by the multiple acoustic transducers.

13 Claims, 7 Drawing Sheets

GRAVEL PACK QUALITY MEASUREMENT

RELATED APPLICATIONS

The present application claims the benefit of priority of U.S. Provisional Patent Application No. 63/032,142 filed May 29, 2020, the entire content of which is incorporated herein by reference.

TECHNICAL FIELD

The present application is generally related to oil and gas operations, and in particular, to measuring the quality of a fracture or a gravel pack in a wellbore.

BACKGROUND

In the petroleum industry, a hydrocarbon sandstone reservoir can produce numerous sizes of formation sand. Formation sand that enters into the wellbore can be damaging to the wellbore, downhole completion equipment, surface equipment, and surface facilities. One method of controlling formation sand production in land or offshore wellbores is to introduce a gravel pack (e.g., proppant pack or natural gravel pack) around a sand screen that is at the reservoir. A complete, well packed (high quality) annulus is desirable to protect a sand screen from erosion and to enable long term high rate production in oil and gas wells. Measurements of the quality of the gravel pack immediately after the installation of the gravel pack may enable steps that remedy a deficiency of the gravel pack. Also, because the quality of a gravel pack can change over time, measurements of the quality of the gravel pack after installation and during oil/gas production can provide information that enable preventive or remedial actions. Thus, a solution that enables periodic or on-demand measurements of the in-situ quality of a gravel pack is desirable.

SUMMARY

The present application is generally related to oil and gas operations, and in particular, to measuring the quality of a fracture or gravel pack in a wellbore. In an example embodiment, a system for measuring a porosity of a gravel pack in a wellbore includes a transmitting acoustic transducer attached to a sand screen and configured to transmit an acoustic signal. The system further includes multiple acoustic transducers situated in the screen annulus and configured to receive the acoustic signal through the gravel pack. The system also includes a control device configured to receive electrical signals from the multiple acoustic transducers and determine the porosity of the gravel pack around the sand screen based on at least the electrical signals. The electrical signals are generated from the acoustic signals received by the multiple acoustic transducers.

In another example embodiment, a system for measuring a porosity of a gravel pack in a wellbore includes a first transmitting acoustic transducer attached to a sand screen and configured to transmit a first acoustic signal and a second transmitting acoustic transducer attached to the sand screen and configured to transmit a second acoustic signal. The system further includes a first set of acoustic transducers attached to the sand screen and configured to receive the first acoustic signal through the gravel pack and a second set of acoustic transducers attached to the sand screen and configured to receive the second acoustic signal through the gravel pack. The second set of acoustic transducers includes one or more acoustic transducers of the first set of acoustic transducers. The system also includes a control device configured to receive first electrical signals from the first set of acoustic transducers and second electrical signals from the second set of acoustic transducers and determine the porosity of the gravel pack around the sand screen based on at least the first electrical signals and the second electrical signals. The first electrical signals are generated from the first acoustic signal received by the first set of acoustic transducers, and the second electrical signals are generated from the second acoustic signal received by the second set of acoustic transducers.

In yet another example embodiment, a system for measuring a porosity of a gravel pack in a wellbore includes a sand screen located in the wellbore, where the gravel pack is installed around the sand screen in an annulus of the wellbore. The system further includes a transmitting acoustic transducer attached to the sand screen and configured to transmit an acoustic signal and multiple acoustic transducers attached to the sand screen and configured to receive the acoustic signal through the gravel pack. The system also includes a control device located in the wellbore and configured to receive electrical signals from the multiple acoustic transducers and determine the porosity of the gravel pack around the sand screen based on at least the electrical signals. The electrical signals are generated from the acoustic signal received by the multiple acoustic transducers.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Some features may be omitted from some of the drawings for clarity. Additionally, certain dimensions or placements may be exaggerated to help visually convey such principles. In the drawings, the same reference numerals used in different figures designate like or corresponding but not necessarily identical elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

In some example embodiments, sand control requires the use of a service tool and downhole completion equipment that includes a sand screen, blank pipes, etc. The service tool is used to lower the downhole completion equipment to a target depth of a wellbore and to place the sand screen across a sandstone reservoir. The service tool may provide a flow path for a gravel pack (as used in this description, gravel pack is intended to include a frac pack) treatment from the surface (e.g., a drillship, a platform, etc.) to the reservoir. After slurry is pumped down into a wellbore through the service tool, an array of acoustic transceivers that are mounted on the outside surface (i.e., facing the reservoir) of the sand screen may be used to measure the quality of the gravel pack in the annulus of the wellbore. A direct measure of a gravel pack's quality is its porosity, and indirectly, its compressional stress. The array of acoustic transceivers can be utilized during and immediately after the gravel pack (e.g., proppant pack or natural gravel pack) is installed and at future times during production and when desired, for example, immediately prior to when the service tool is removed after the gravel pack is installed.

Figure 1:
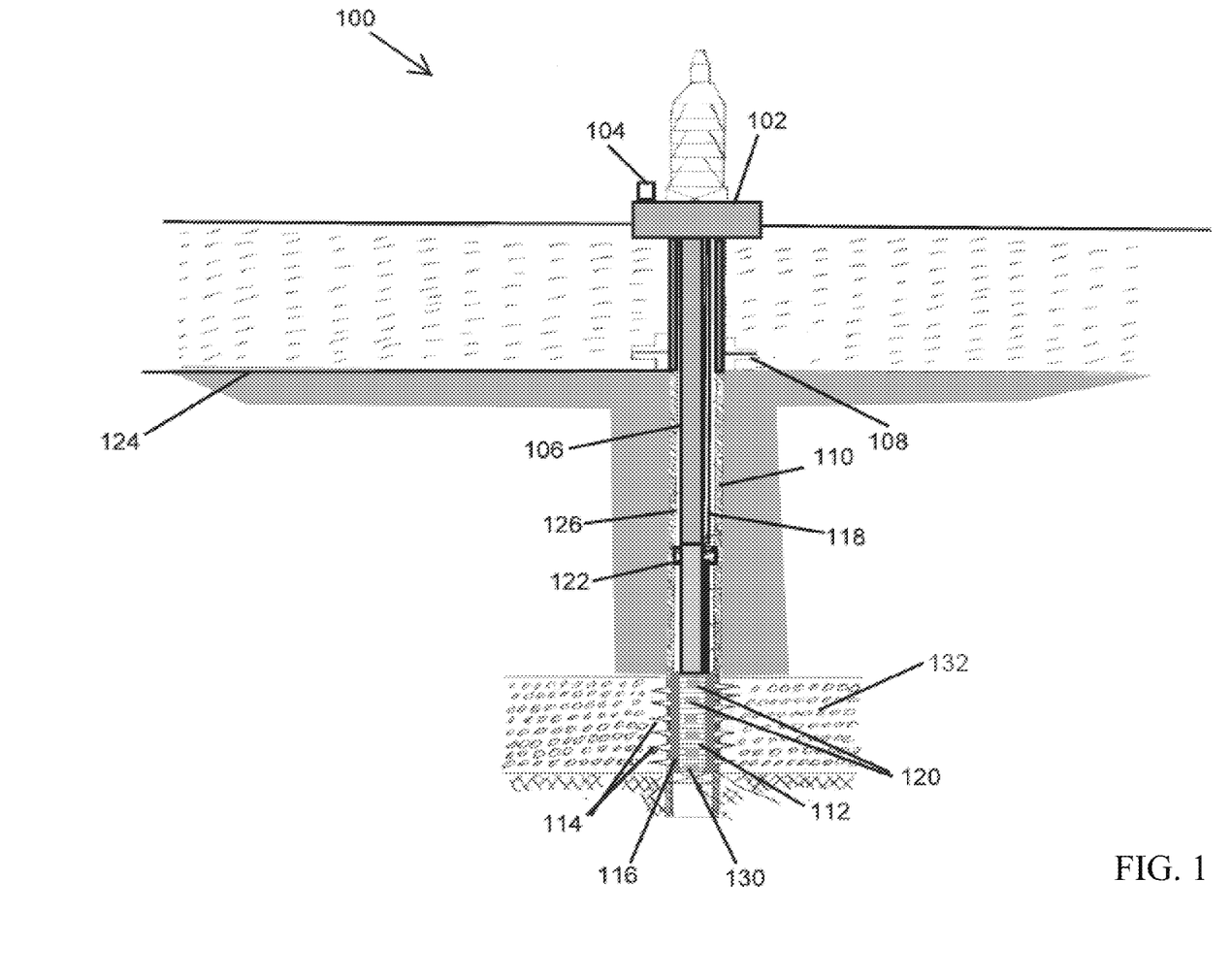
FIG. 1 illustrates an offshore oil and gas production system including a system for measuring the quality of a gravel pack according to an example embodiment.

Turning now to the drawings, FIG. 1 illustrates an offshore oil and gas production system 100 including system components for measuring the quality of a gravel pack 116 according to an example embodiment. In some example embodiments, the system 100 includes a floating platform 102 and a system controller 104 that may control operations of the system 100 and process information received from components in a wellbore 126. The system 100 may also include a production tubing 106 that extends down from the platform 102 past a blowout preventer 108 (and/or another well control device) and through a casing 110 and the sea floor 124. The system 100 may further include a packer 122 that isolates the lower completion section of the wellbore 126. The wellbore 126 may have a cased-hole completion as shown in FIG. 1 or may alternatively have an open hole completion, where the wellbore is left open (i.e., uncased) at the bottom. For example, when the wellbore 126 is a cased-hole, perforations such as perforations 114 may be formed through the casing 110 at the reservoir 132.

In some example embodiments, the system 100 may include acoustic transducers, such as acoustic transducers 120, that may be attached to the sand screen 112. The acoustic transducers may be attached to the sand screen 112 before the sand screen is placed in the wellbore 126 at the reservoir 132. For example, some or all of the acoustic transducers may generate an acoustic signal from a received electrical signal, and some or all of the acoustic transducers may generate an electrical signal from a received acoustic signal. The system 100 may also include a control device 130. The control device 130 may control the generation and reception of acoustic signals by the acoustic transducers. For example, the control device 130 may control the acoustic transducers such that only one of the acoustic transducers generates an acoustic signal at one time while some or all of the remaining acoustic transducers receive the generated acoustic signal. Alternatively, the control device 130 may control the acoustic transducers such that two or more the transducers generate a respective acoustic signal at the same time, for example, based on the locations of the transducers on the sand screen 112. The control device 130 may include a microcontroller or a microprocessor as well as a memory device that stores software code that is executable by the microcontroller/microprocessor to perform some of the operations described herein with respect to the control device 130. The control device 130 may also include other components such as transmitters, receivers, analog-to-digital converters, digital-to-analog converters, etc. as can be readily understood by those of ordinary skill in the art with the benefit of this disclosure. The acoustic transducers, such as acoustic transducers 120, may also include analog-to-digital converters, digital-to-analog converters, etc. as can be readily understood by those of ordinary skill in the art with the benefit of this disclosure.

In some example embodiments, the control device 130 may obtain, from the acoustic transducers that receive acoustic signals, electrical signals generated by the acoustic transducers from the received acoustic signals. The control device 130 may process the electrical signals to determine information, such as component travel times of acoustic signals from acoustic transducers that transmit the acoustic signals to the acoustic transducers that receive the acoustic signals. To illustrate, acoustic transducers that generate a respective electrical signal from a received acoustic signal may store the generated electrical signal, for example, digitally (e.g., as a digital waveform) in a memory device. The acoustic transducers may then send or otherwise provide the respective stored electrical signal to the control device 130 as a digital signal, for example, upon request by the control device 130. In FIG. 1, the portion of the gravel pack 116 that covers the acoustic transducers and the control device 130 is omitted for illustrative purposes to show the acoustic transducers and the control device 130 that are attached to the sand screen 112 on the outside of the sand screen 112.

In some example embodiments, the control device 130 may communicate with the transducers via an electrical cable that extends between the acoustic transducers and the control device 130. For example, for each transmission of an acoustic signal, the control device 130 may process the electrical signals received/obtained from the receiving acoustic transducers to determine the travel times of the acoustic signal from the acoustic transducer that transmitted the acoustic signal to the acoustic transducers that received the acoustic signal through the gravel pack 116. By controlling the generation/transmission and reception of acoustic signals by multiple acoustic transducers and by processing the electrical signals received/obtained from the acoustic transducers that receive the acoustic signals through the gravel pack 116, the control device 130 may determine travel times of acoustic signals through the gravel pack 116. To illustrate, the control device 130 may analyze the electrical signal in view of the activation times of transmission and reception of acoustic signals. In some alternative embodiments, the control device 130 may transmit the electrical signals and other information to the controller 104 for processing at the surface to determine travel times of acoustic signals through the gravel pack 116. Because the transducers may be attached to the sand screen 112 spread along the length and circumference of the sand screen 112 and covered by the gravel pack 116, the control device 130 may determine travel times of acoustic signals through many discrete volumes and comprising the total volume of the gravel pack 116.

In some example embodiments, the control device 130 may determine the porosity of the gravel pack 116 based on the travel times of the compressional acoustic signals through the gravel pack 116 using, for example, the Wyllie equation (described in M. R. J. Wyllie, A. R. Gregory, and L. W. Gardner, (1956), "ELASTIC WAVE VELOCITIES IN HETEROGENEOUS AND POROUS MEDIA," GEOPHYSICS 21: 41-70, which is provided below:

$$1/V = phi/Vfl + (1-phi)/Vgp$$

from which we can calculate porosity according to the following:

$$phi = (1/V - 1/Vgp)/(1/Vfl - 1/Vgp)$$

wherein:

phi is porosity of the gravel pack;

V is compressional velocity of the gravel pack in situ measured by the proposed device(s);

Vgp is compressional velocity of the gravel pack material at zero porosity (can be measured at the surface); and Vfl is compressional velocity of the fluid filling up the pores of the gravel pack.

Further, because the locations of the acoustic transducers on the sand screen 112 are known (e.g., programmed into the control device 130), the control device 130 may determine the porosities of a large volume of the gravel pack 116 based on the travel times of the acoustic signals through the gravel pack 116 in view of the locations of transmitting and receiving acoustic transducers.

In some example embodiments, the acoustic signal generated by an acoustic transducer may reach another acoustic transducer through different routes. For example, an acoustic signal may travel through multiple routes to reach a receiving acoustic transducer. To illustrate, an acoustic signal may travel through the sand screen 112, the gravel pack 116, and/or the casing 110 (when a cased-hole completion) before arriving at a receiving acoustic transducer, and thus, possibly resulting in multiple receptions of the acoustic signal by the receiving acoustic transducer. Additionally, a received acoustic signal has a number of components (e.g., compressional, shear & surface) whose velocity and amplitude is affected by the material properties of the medium. In some example embodiments, the receiving acoustic transducer may record and provide to the control device 130 an electrical signal that represents reception of the acoustic signal through the different routes. The control device 130 may determine from an interval of the electrical signal that corresponds to the route through the gravel pack 116, for example, at least based on the expected speed of the acoustic signals through the different media.

In some alternative embodiments, instead of the control device 130, another control device that is in a wash pipe tool attached to a wash pipe may process the electrical signals received from the acoustic transducers to determine the porosity of the gravel pack 116 using, for example, the Wyllie equation and the travel times of the acoustic signals through the gravel pack 116. For example, during the placement of the gravel pack 116 around the sand screen 112, a wash pipe tool attached to a wash pipe may perform the operations described herein with respect to the control device 130, including identifying travel times through the gravel pack 116. As another example, the control device 130 may transmit electrical signals from the acoustic transducers and other information to the controller 104 or another device for processing to determine the porosity of the gravel pack 116.

In some alternative embodiments, instead of performing processing the electrical signals, the control device 130 may transmit the electrical signals received from the transducers and other relevant information (e.g., acoustic transduce trigger times for transmissions and receptions) to the system controller 104 at the platform 102. For example, the control device 130 may transmit the electrical signals and/or related information to the system controller 104 via one or more cables 118. To illustrate, the one or more cables 118 may include one or more electrical cables, one or more optical fibers, etc. The system controller 104 may receive the signals and/or other information from the control device 130 and determine the porosity of the gravel pack 116 in a similar manner as described with respect to the control device 130.

In some example embodiments, the system controller 104 at the platform 102 may provide power to the acoustic transducers and the control device 130 via the one or more cables 118 that extend down from the platform 102. Alternatively or in addition, the control device 130 may include a battery that is used to provide power to the transducers and to the control device 130. In some alternative embodiments, a power generation or storage mechanism that is located in the wellbore 126 may provide power to the transducers and the control device 130.

In some example embodiments, the acoustic signal generated by the acoustic transducers, such as the acoustic transducers 120, may be a specially formed waveform to enable enhanced processing and resolution, e.g., a chirp. In some exemplary embodiments, the formed waveform may have a base frequency of less than 24 KHz. Alternatively, the acoustic transducers may transmit another type of acoustic signal without departing from the scope of this disclosure. In some example embodiments, the acoustic signals may be generated to have frequencies that facilitate the determination of travel times of the acoustic signals through the gravel pack 116. In some example embodiments, the transducers may be spaced on the sand screen 112 to facilitate the determination of travel times of the acoustic signals through the gravel pack 116.

In some alternative embodiments, the one or more cables 118 may include an optical fiber that includes a section located at the sand screen 112 (e.g., wrapped around the sand screen 112). Bragg gratings embedded within the fiber or sections of the optical fiber attached to the sand screen 112 may be affected by pressures exerted by an acoustic signal that is transmitted by an acoustic transducer and travelled through the gravel pack 116 to reach the section of the optical fiber. For example, pressures exerted by an acoustic signal at different points along the length of the section of the optical fiber may affect the characteristics of an optical signal traveling through the section of the optical fiber. The optical signal that is affected by the impact of the pressures on the optical fiber may travel up to the system controller 104 through rest of the optical fiber. The system controller 104 may transmit, receive, and record the optical signal. The system controller 104 or another device may determine the porosity of the gravel pack 116 based on the effect of the pressures on the optical fiber, and thus, the effects of the pressures on the optical signal traveling through the optical fiber. In some example embodiments, the control device 130 may control the generation of acoustic signals that result in the pressures on the section of the optical fiber at the sand screen 112.

In some alternative embodiments, the system 100 may be an onshore operation system without departing from the scope of this disclosure. In some alternative embodiments, the wellbore 126 may be a slanted/deviated wellbore without departing from the scope of this disclosure. In some alternative embodiments, the system 100 may include other system components without departing from the scope of this disclosure.

Figure 2:
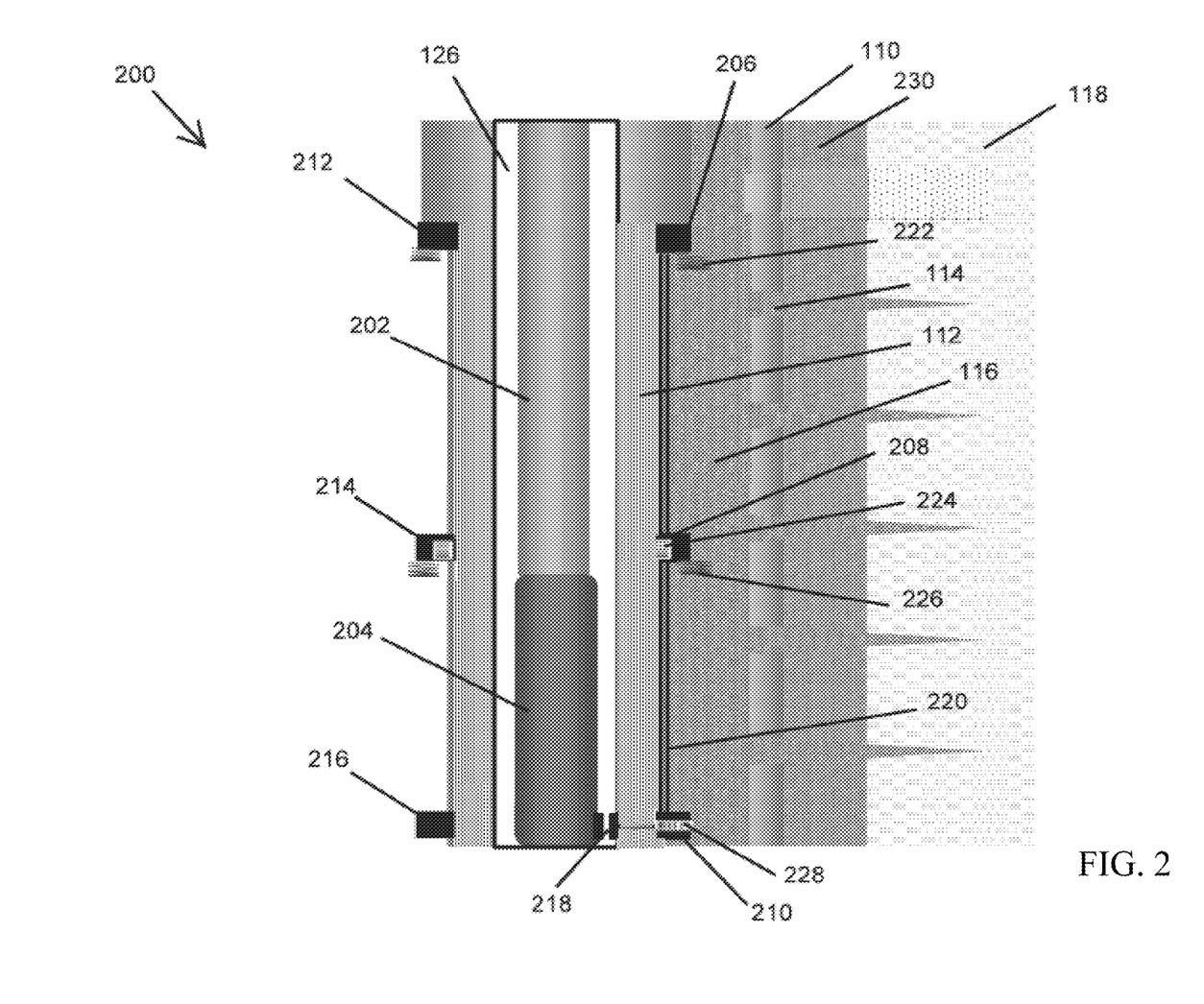
FIG. 2 illustrates a system for measuring the quality of a gravel pack prior to oil or gas production according to an example embodiment.

FIG. 2 illustrates a system 200 for measuring the quality (i.e., porosity) of a gravel pack prior to oil/gas production according to an example embodiment. Referring to FIGS. 1 and 2, in some example embodiments, the system 200 for measuring the quality of the gravel pack 116 may include an array of acoustic transducers including acoustic transceivers 206-216. The acoustic transceivers 206-216 may be attached to the sand screen 112 to transmit and receive acoustic signals through the gravel pack 116. For example, the acoustic transceivers 206-216 may be located on the outside of the sand screen 112 facing the gravel pack 116. A respective sound dampening material may be placed between the acoustic transceivers 206-216 and the sand screen 112 to dampen the transfer of sound between the acoustic transceivers 206-216 and the sand screen 112. A sound dampening material may also be placed to dampen the transfer of sound between the acoustic transceivers 206-216 and the casing 110. In general, the acoustic transceivers 206-216 may be spread across the length and circumference of the sand screen 112 such that an acoustic signal transmitted by one of the acoustic transceivers 206-216 is received by at least some of the other acoustic transceivers 206-216 through the gravel pack 116. In some example embodiments, the acoustic transceivers 206-216 may correspond to and operate in a similar manner as the acoustic transducers 120 described above with respect to FIG. 1.

In some example embodiments, the system 200 may also include a wash pipe tool 204 that is attached to a wash pipe 202. For example, the wash pipe tool 204 may be located close to the bottom of the wellbore 126 during the placement of the gravel pack 116 around the outside of the sand screen 112. The wash pipe tool 204 may include a control device that performs the operations described above with respect to the control device 130 shown in FIG. 1, and thus the wash pipe tool operates as a control device. During and after the installation of the gravel pack 116 and before the start of oil/gas production, the wash pipe tool 204 may be used in the measurement of the quality of the gravel pack 116. In general, the wash pipe tool 204 may remain in the wellbore 126 until it is pulled out, for example, before the start of production.

In some example embodiments, some of the acoustic transceivers 206-216 may transmit an acoustic signal, for example, omnidirectionally and also receive acoustic signals transmitted by some of the other acoustic transceivers 206-216. For example, the acoustic transceivers 206-216 may each include an acoustic transmitting element and an acoustic receiving element. To illustrate, the acoustic transceivers 206-216 may each include a piezoelectric transducer that generates an acoustic signal from an electrical signal and another piezoelectric transducer that generates an electrical signal from an acoustic signal. Alternatively, at least some of the acoustic transceivers 206-216 may each include a single piezoelectric transducer that can generate an acoustic signal from an electrical signal and generate an electrical signal from an acoustic signal. The acoustic transceivers 206-216 may store the electrical signal (e.g., digitally in a memory device) generated from a received acoustic signal and provide the stored electrical signal to the wash pipe tool 204, for example, in response to a command from the wash pipe tool 204.

In some example embodiments, the acoustic transceivers 206-216 may be communicably coupled to the wash pipe tool 204 via inductive coupling, for example, using inductive terminals 218 and a cable 220. To illustrate, the wash pipe tool 204 may control, via the inductive terminals 218 and the cable 220, acoustic signal generation by at least some of the acoustic transceivers 206-216 and may obtain from at least some of the acoustic transceivers 206-216 stored electrical signals generated from received acoustic signals. In some example embodiments, the wash pipe tool 204 may include a power source, such as a battery, and may provide power to the acoustic transceivers 206-216 via inductive terminals 218 and a cable 220.

During operations, the wash pipe 204 may send a command (e.g., an electrical signal) to the acoustic transceiver 206 via the cable 220, and the acoustic transceiver 206 may generate an acoustic signal 222 from or based on the command. The acoustic transceiver 206 may transmit the acoustic signal 222, which may be received by the acoustic transceivers 208, 214. Each acoustic transceiver 208, 214 may receive the acoustic signal 222 and generate an electrical signal from the received acoustic signal 222. Each acoustic transceiver 208, 214 may also store the electrical signal (e.g., digitally in a memory device) in the respective acoustic transceivers 208, 214.

In some example embodiments, because the acoustic signal 222 may travel through different routes to reach the acoustic transceivers 208, 214, the acoustic signal 222 may be received by the acoustic transceivers 208, 214 multiple times. For example, the different routes may be through the sand screen 112, the gravel pack 116, and/or the casing 110 (when present) that may be bordered by cement 230. To illustrate, each acoustic transceiver 208, 214 may generate an electrical signal that represents the receptions of the acoustic signal 222 through three different routes are represented.

In some example embodiments, the wash pipe tool 204 may send one or more commands or otherwise control the acoustic transceiver 208, 214 via the cable 220 to obtain the stored electrical signal(s) stored in the acoustic transceiver 208, 214. The electrical signal(s) stored in the acoustic transceiver 208 are illustratively designated as 224 in FIG. 2. In general, the wash pipe tool 204 may obtain the stored electrical signal(s) with respect to the acoustic signal 222 from other acoustic transceivers, such as the transceivers 210, 212, 216, in addition to signals from the acoustic transceivers 208, 214.

In some example embodiments, before or after obtaining the stored electrical signals from the acoustic transceiver 208, 214, the wash pipe 204 may send a command (e.g., an electrical signal) to the acoustic transceiver 208 via the cable 220, and the acoustic transceiver 208 may generate an acoustic signal 226 from or based on the received command. The acoustic signal 226 may be received by at least the acoustic transceivers 210, 216 that may generate, store, and electrically transmit a respective electrical signal. The electrical signal(s) stored in the acoustic transceiver 210 are illustratively designated as 228 in FIG. 2.

As described above with respect to the acoustic transceiver 208, 214, each acoustic transceiver 210, 216 may receive the acoustic signal 226 via different routes, including through the gravel pack 116. The wash pipe tool 204 may obtain the stored electrical signals from the acoustic transceivers 210, 216 via the cable 220 in a similar manner as described with respect to the acoustic transceiver 208, 214. In general, the wash pipe tool 204 may obtain the stored electrical signal(s) with respect to the acoustic signal 226 from other acoustic transceivers, such as the acoustic transceivers 206, 212, 214, in addition to from the acoustic transceivers 210, 216.

In some example embodiments, the wash pipe tool 204 may control the other acoustic transceivers of the acoustic transceivers 206-216 in a similar manner to control the generation of acoustic signals and to obtain the stored acoustic electrical signals from acoustic transceivers that receive a transmitted acoustic signal. For example, the wash pipe tool 204 may control the acoustic transceiver 212 to generate an acoustic signal that is received by the same acoustic transceivers that receive the acoustic signal 222. In general, acoustic transceivers that are located to receive an acoustic signal transmitted by a transmitting acoustic transceiver through the gravel pack 116 may receive the acoustic signal and generate an electrical signal from it.

In some example embodiments, the wash pipe tool 204 may obtain or otherwise receive the stored electrical signals from acoustic transceivers via the cable 220 and inductive terminals 218 and process the electrical signals to determine travel times of acoustic signals through the gravel pack 116 between transmitting acoustic transceivers and receiving acoustic transceivers. The wash pipe tool 204 may determine the travel times through the gravel pack 116 by processing the electrical signals received from the acoustic transceivers and that correspond to respective acoustic signals received by the acoustic transceivers through the different media including the sand screen 112, the gravel pack 116, and the casing 110 (when present). The wash pipe tool 204 may determine the porosity of various volumes of the gravel pack 116 based on the travel times of the acoustic signals or absence thereof through the various materials. In some alternative embodiments, the wash pipe tool 204 may transmit the porosity or void information to the surface via the cable 118, acoustically, or using other means. In some alternative embodiments, the wash pipe tool 204 may send qualitative information (e.g., a flag indicating the presence of a void) to the surface (e.g., to the system controller 104) in response to determining that the porosity of the gravel pack 116 or the porosity of an area of the gravel pack 116 is above an acceptable level. In some alternative embodiments, the wash pipe tool 204 may send the electrical signals obtained from the acoustic transceivers and other information (e.g., activation time of acoustic transceivers) to the system controller 104, which may process the signals and/or other information to determine the porosity of the gravel pack 116. As can be readily understood by those of ordinary skill in the art with the benefit of this disclosure, the wash pipe tool 204 may store the electrical signals obtained/received from the acoustic transceivers for processing and/or transmission either immediately or on retrieval to surface.

By using an array of acoustic transceivers that are positioned at various locations on the sand screen 112, the travel times of acoustic signals through discrete volumes of the total gravel pack 116 may be determined. The porosity of the gravel pack 116 may be determined (i.e., effectively measured) by the wash pipe tool 204 or by another device (e.g., the system controller 104) based on the travel times. By determining the porosity of the gravel pack 116, preventive or remedial actions that may result in improved wellbore performance may be taken.

In some alternative embodiments, multiple or single focused or omni-directional transmitting transceiver/receiving transceiver sets may be placed at a multiple or single locations on each sand screen 112 at an optimized spacing and acoustically isolated from the screen 112 using a dampening material to enhance the signal-to-noise ratio of the acoustic signal 222 through a volume of the gravel pack 116 relative to travel paths through the screen 112 and the casing 110 when present. The transmitting transceiver/receiving transceiver sets may be located along, above, below or between the sand screen(s) 112. The spacing between the transmitters and receivers of each set is such that acoustic travel times in the gravel-pack can be measured with minimal requirement for complex signal processing. For example, the spacing between the transmitters and the receivers of a set may be set based on characteristics of a particular system including the type of gravel pack, whether the well bore is cased or uncased, etc. as can be readily understood by those of ordinary skill in the art with the benefit of this disclosure. As an illustrative example, the acoustic transceiver 208 may be located within a close distance from the acoustic transceiver 206 such that the acoustic signal 222 transmitted by the acoustic transceiver 206 is received by the acoustic transceiver 208 dominantly through the volume of the gravel pack 116 between the acoustic transceivers 206 and 212 and minimally, if any, through the casing 110 and the sand screen 112. The acoustic signal 222 received by the acoustic transceiver 208 through the small volume of the gravel pack 116 between the acoustic transceiver 206 and the acoustic transceiver 208 can then be analyzed and used to infer the gravel-pack porosity in the greater volume of the gravel pack 116. As an illustrative example, the acoustic transceiver 214 may be located within a threshold distance from the acoustic transceiver 212 such that the acoustic signal transmitted by the acoustic transceiver 206 is received by the acoustic transceiver 208 dominantly through the volume of the gravel pack 116 between the acoustic transceivers 212 and 214 and minimally, if any, through the casing 110 and the sand screen 112.

In some alternative embodiments, some of acoustic transceivers 206-216 may be replaced by or operate as either an acoustic transmitter or an acoustic receiver without departing from the scope of this disclosure. In some example embodiments, the gravel pack quality measurement system 200 of FIG. 2 may include more or fewer acoustic transceivers than shown. In some example embodiments, the bottom of the wellbore 126 may be open-hole without departing from the scope of this disclosure. In some example embodiments, each transmitted acoustic signal may be received by at least four acoustic transceivers that are spaced around the sand screen 112. In some example embodiments, multiple sets of acoustic transceivers that each include transmitting acoustic transceivers and receiving acoustic transceivers may be placed adjacently along the entire length of the sand screen 112 such that transmitted acoustic signals travel through substantial parts of the gravel pack 116, which allows measurements of the quality of substantial volumes of the gravel pack 116. In some alternative embodiments, the wellbore 126 may be a slanted/deviated well without departing from the scope of this disclosure. In some example embodiments, other connections may be used instead of or in addition to the inductive terminals 218. For example, electrical, acoustic, and/or other means for communication and power transmission may be used as can be readily understood by those of ordinary skill in the art with the benefit of this disclosure.

Figure 3:
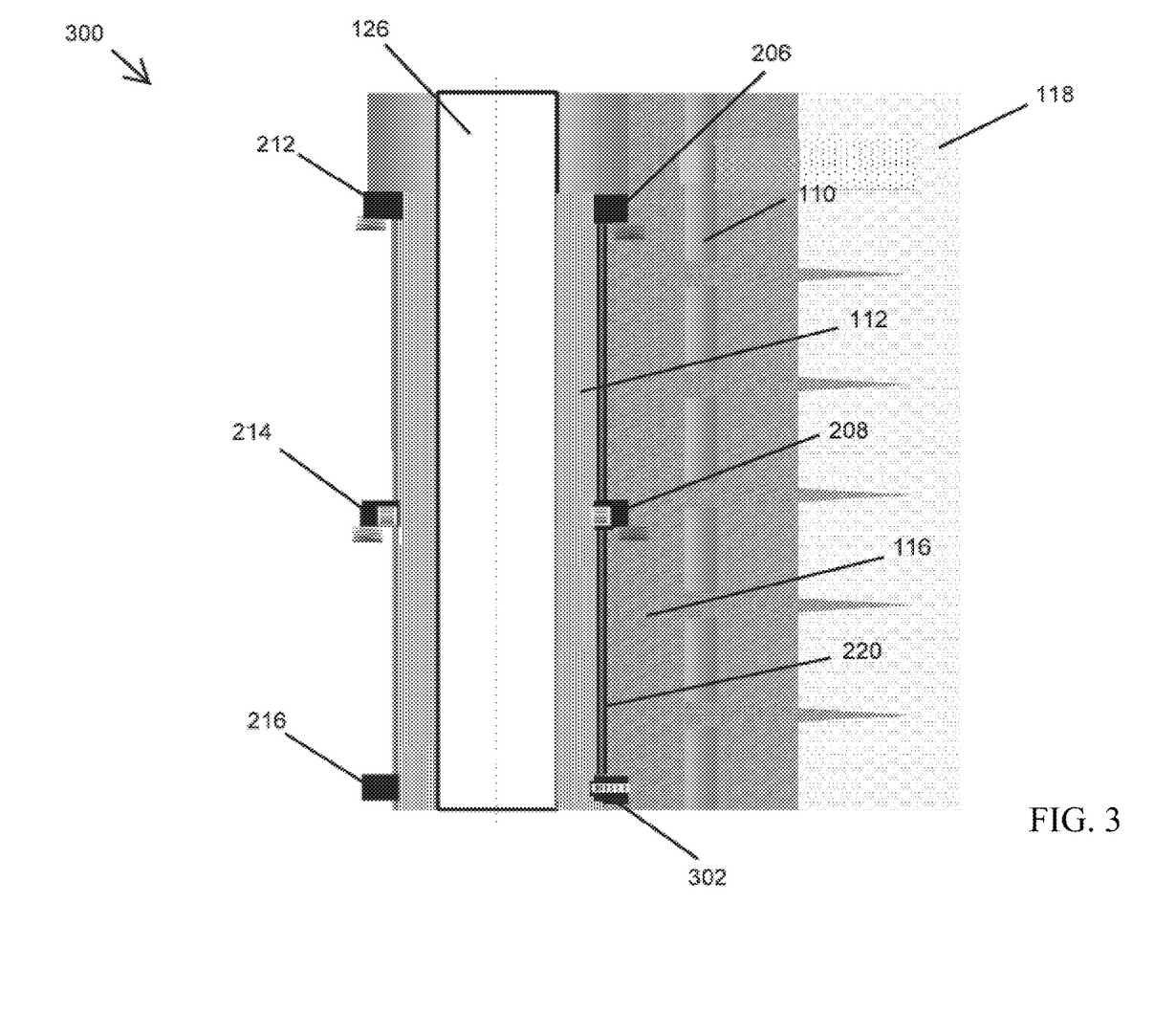
FIG. 3 illustrates a system for measuring the quality of a gravel pack according to another example embodiment.

FIG. 3 illustrates a system 300 for measuring the quality of a gravel pack according to another example embodiment. Referring to FIGS. 1-3, in general, the gravel pack quality measurement system 300 of FIG. 3 operates in a similar manner as the system 200 of FIG. 2. In contrast to the system 200 that is designed to measure gravel pack porosity prior to the start of oil/gas production, the system 300 may be used to measure the porosity of the gravel pack 116 before and after the start of oil/gas production. To illustrate, the system 300 does not include the wash pipe tool 204 that is attached to the wash pipe 202 of FIG. 2. Instead, the system 300 includes a control device 302 that may perform some or all of the functions described above with respect to the wash pipe tool 204. For example, the control device 302 may be or may include the control device 130 described with respect to FIG. 1.

In some example embodiments, the system 300 includes an array of acoustic transceivers, including the acoustic transceivers 206, 208, 212-216, that operate in a similar manner as described above with respect to FIG. 2. A respective sound dampening material may be placed between the individual acoustic transceivers 206, 208, 212-216 and the sand screen 112 to dampen the transfer of sound between the acoustic transceivers 206, 208, 212-216 and the sand screen 112. A sound dampening material may also be placed to dampen the transfer of sound between the acoustic transceivers 206, 208, 212-216 and the casing 110. The control device 302 may control the generation of acoustic signals by at least some of the acoustic transceivers 206, 208, 212-216 and obtain/receive electrical signals generated by at least some of the acoustic transceivers 206, 208, 212-216 from received acoustic signals. For example, the control device 302 may control the generation of acoustic signals by providing one or more commands (e.g., electrical signals) to at least some of the acoustic transceivers 206, 208, 212-216 via the cable 220. The control device 302 may receive/obtain, via the cable 220, electrical signals generated by at least some of the acoustic transceivers 206, 208, 212-216.

In some example embodiments, the control device 302 may determine the porosity of the gravel pack 116 based on electrical signals received from at least some of the acoustic transceivers 206, 208, 212-216 and transmit, for example, an alert flag if the porosity of the gravel pack 116 is above a threshold porosity level (e.g., 40 porosity units). Alternatively or in addition, the control device 302 may transmit, for example, via the cable 118, the electrical signals and/or other received information to the system controller 104 or to another device that may determine the porosity of the gravel pack 116.

In some example embodiments, the control device 302 may provide power to the acoustic transceivers 206, 208, 212-216 as well as other components (e.g., a microprocessor, a memory device, etc.) of the control device 302. For example, the control device 302 may include a battery. Alternatively, a power generation or storage mechanism that is at a different location in the wellbore 126 may provide power to the transducers and the control device 302. In some example embodiments, power and commands may be provided to the control device 302 from the surface wirelessly or via a wired connection as can be readily understood by those of ordinary skill in the art with the benefit of this disclosure. In some alternative embodiments, the control device 302 may be at a different location (e.g., above or below the sand screen 112) than shown in FIG. 3 without departing from the scope of this disclosure.

In some alternative embodiments, multiple or single focused transmitting transceiver/receiving transceiver sets may be placed at a single or multiple locations on each sand screen 112 at an optimized spacing and acoustically isolated from the screen 112 using a dampening material to enhance the signal-to-noise ratio of the acoustic signal 222 through a volume of the gravel pack 116 relative to travel paths through the screen 112 and the casing 110 when present. The transmitting transceiver/receiving transceiver sets may be spaced and operate in a similar manner as described with respect to FIG. 2.

In some example embodiments, the system 300 may include more or fewer acoustic transceivers than shown. In some example embodiments, the bottom of the wellbore 126 may be open-hole without departing from the scope of this disclosure.

Figure 4:
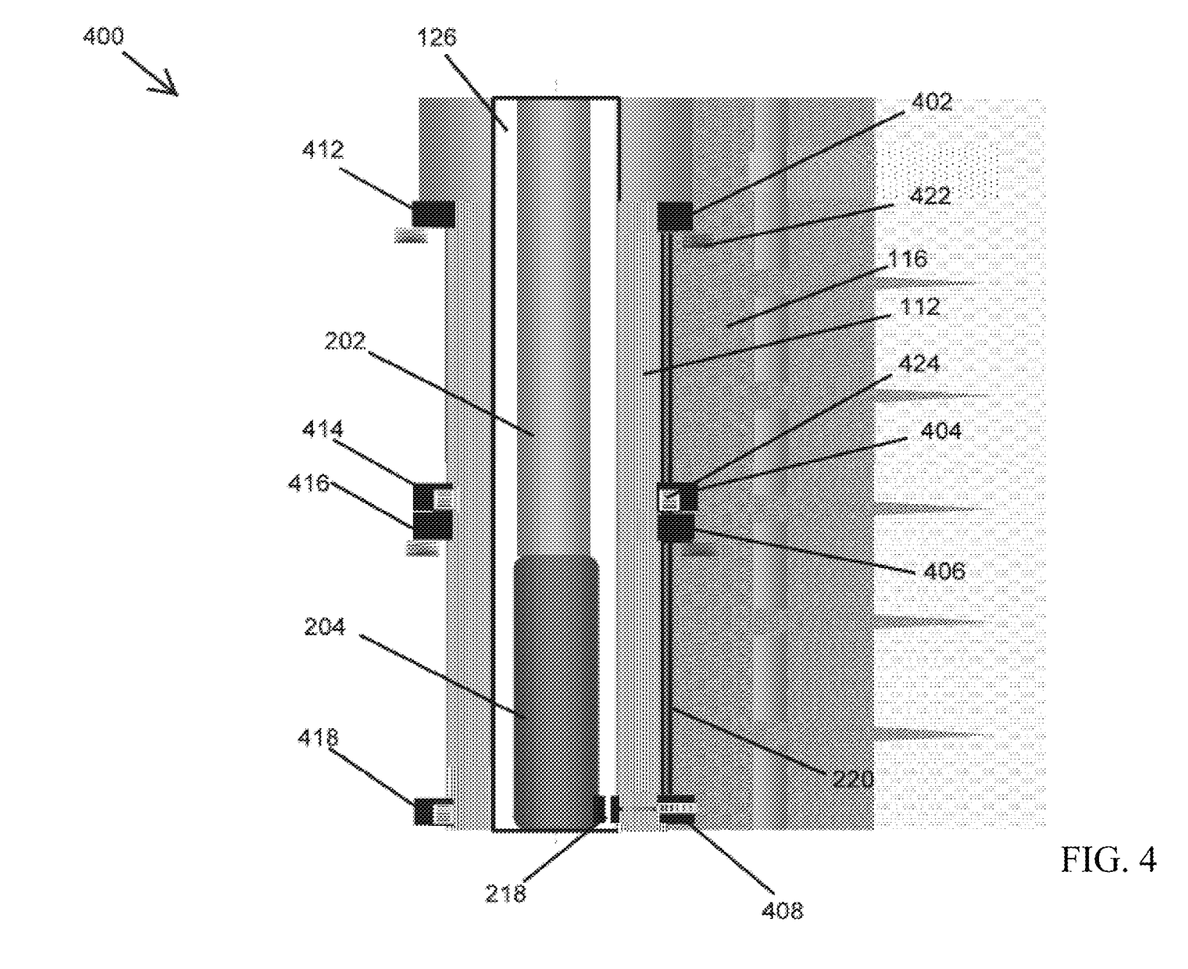
FIG. 4 illustrates a system for measuring the quality of a gravel pack prior to oil or gas production according to another example embodiment.

FIG. 4 illustrates a system 400 for measuring the quality of a gravel pack prior to oil/gas production according to another example embodiment. Referring to FIGS. 1, 2, and 4, in general, the gravel pack quality measurement system 400 of FIG. 4 operates in a similar manner as the system 200 of FIG. 2. In contrast to the system 200 that includes acoustic transceivers 206-216, the system 400 includes an array of acoustic transducers that include acoustic transmitters and acoustic receivers that are separate from the acoustic transmitters. To illustrate, the system 400 includes acoustic transmitters 402, 406, 412, and 416 and acoustic receivers 404, 408, 414, 418. A respective sound dampening material may be placed between the individual acoustic transmitters 402, 406, 412, and 416 and the sand screen 112 to dampen the transfer of sound between the acoustic transceivers 206, 208, 212-216 and the sand screen 112. A respective sound dampening material may be placed between the individual acoustic receivers 404, 408, 414, 418 and the sand screen 112 to dampen the transfer of sound between the acoustic receivers 404, 408, 414, 418 and the sand screen 112. A sound dampening material may also be placed to dampen the transfer of sound between the individual acoustic transceivers 206, 208, 212-216 and the casing 110. The wash pipe tool 204 controls, via the cable 220, the generation of acoustic signals by the acoustic transmitters 402, 406, 412, and 416 and may obtain/receive electrical signals generated by the acoustic receivers 404, 408, 414, 418 from the acoustic signals.

In some example embodiments, during operations, the wash pipe 204 may send a command (e.g., an electrical signal) to the acoustic transmitter 402 via the cable 220, and the acoustic transmitter 402 may transmit an acoustic signal 422 (e.g., a chirp) generated from or based on the command. The acoustic signal 422 may be received by the acoustic receivers 404, 414 and other acoustic receivers after the acoustic signal 422 travels through the gravel pack 116. The acoustic receivers 404, 414 may each generate a respective electrical signal from the acoustic signal 422 and provide the electrical signal to wash pipe tool 204 via the inductive terminals 218 and the cable 220, for example, in response to a request by the wash pipe tool 204. For example, the wash pipe tool 204 may individually communicate with the acoustic receivers 404, 414 to obtain the recorded electrical signals from the acoustic receivers 404, 414.

In some example embodiments, the system 400 may include other acoustic receivers that receive the acoustic signal 422 through the gravel pack 116 and provide electrical signals generated from the acoustic signal 422 to the wash pipe tool 204 via the terminals 218 and the cable 220. For example, the wash pipe tool 204 may communicate with other acoustic receivers that receive the acoustic signal 422 to obtain the electrical signals generated from the acoustic signal 422.

In some example embodiments, the wash pipe tool 204 may control the generation of acoustic signals (e.g., chirps) by the other acoustic transmitters 406, 412, 416 by providing a command (e.g., an electrical signal) to one of the acoustic transmitters 406, 412, 416 at a time. The wash pipe tool 204 may also communicate with at least some of the acoustic receivers 404, 408, 414, 418 to obtain/receive electrical signals generated from acoustic signals transmitted by the acoustic transmitters 406, 412, 416.

In some example embodiments, each acoustic receiver 404, 408, 414, 418 may receive a transmitted acoustic signal through multiple routes (e.g., through the sand screen 112, the gravel pack 116, and the casing 110 (when a cased-hole)) and generate and record/store an electrical signal representing the reception of the acoustic signal through the multiple routes. The wash pipe tool 204 may receive the electrical signals from each acoustic receiver 404, 408, 414, 418 and may determine the electrical signal corresponding to the route through the gravel pack 116 in a similar manner as described with respect to FIG. 1.

In some example embodiments, the wash pipe tool 204 may process electrical signals received from the acoustic receivers 404, 408, 414, 418 and determine the porosity of the gravel pack 116 in a similar manner as described with respect to FIGS. 1 and 2. For example, the wash pipe tool 204 send an alert flag to the system controller 104, for example, via the cable 118 if the porosity of the gravel pack 116 is below a threshold porosity level (e.g., 40 porosity units). Alternatively, the wash pipe tool 204 may send the electrical signals received from the acoustic receivers 404, 408, 414, 418 to the system controller 104 or to another device for processing to determine the porosity of the gravel pack 116.

In some example embodiments, the acoustic transmitters and acoustic receivers may be spread along the entire length and circumference of the sand screen 112 such that the porosity of the gravel pack 116 that is around the entire sand screen 112 may be measured. In some alternative embodiments, multiple or single focused acoustic transmitters/acoustic receiver sets may be placed on the sand screen 112 at an optimized spacing and acoustically isolated from the screen 112 using a dampening material to enhance the signal-to-noise ratio of the acoustic signal through a volume of the gravel pack 116 relative to travel paths through the screen 112 and the casing 110 when present. The acoustic transmitters/acoustic receiver sets may be spaced and operate in a similar manner as described with respect to FIG. 2. In some example embodiments, the system 400 may include more or fewer acoustic transmitters and acoustic receivers than shown. In some example embodiments, the bottom of the wellbore 126 may be open-hole without departing from the scope of this disclosure.

Figure 5:
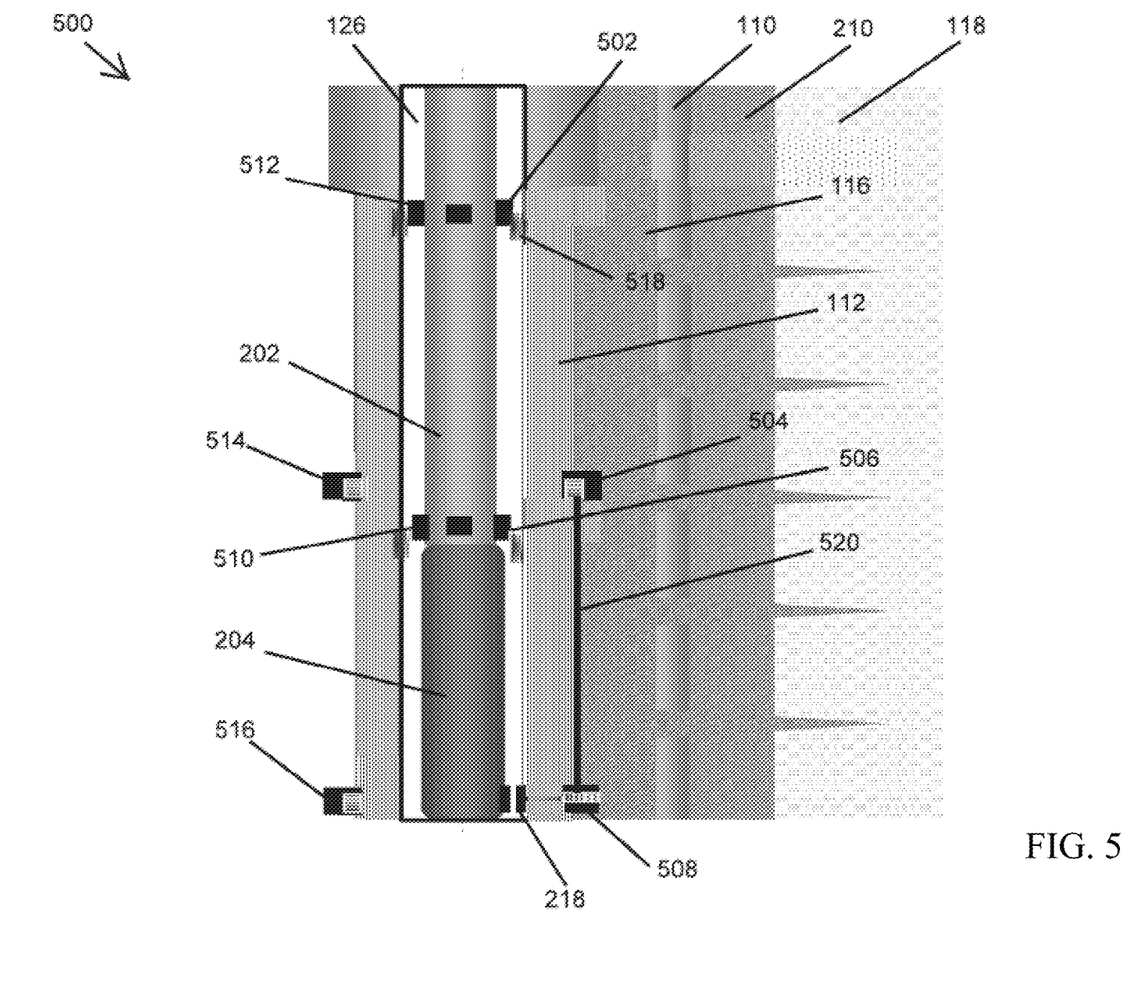
FIG. 5 illustrates a system for measuring the quality of a gravel pack prior to oil or gas production according to another example embodiment.

FIG. 5 illustrates a system 500 for measuring the quality of a gravel pack prior to oil/gas production according to another example embodiment. In some example embodiments, the system 500 includes an array of acoustic transducers including acoustic transceivers 502-516. In contrast to the system 200 of FIG. 2, the acoustic transducers 502, 506, 510, 512 and other acoustic transceivers of the system 500 that transmit acoustic signals may be attached to the wash pipe 202, and the acoustic transceivers 504, 508, 514, 516 and other acoustic transceivers of the system 500 that receive acoustic signals may be attached to the sand screen 112. In some example embodiments, the acoustic transceivers 504, 508, 514, 516 may be accelerometers that measure pipe ringing/vibration. A respective sound dampening material may be placed between the individual acoustic transceivers 504, 508, 514, 516 and the sand screen 112 to dampen the transfer of sound between the acoustic transceivers 504, 508, 514, 516 and the sand screen 112. A sound dampening material may also be placed to dampen the transfer of sound between the acoustic transceivers 504, 508, 514, 516 and the casing 110.

For example, an acoustic signal 518 transmitted by the acoustic transceiver 502 may be received by the acoustic transceivers 504, 514 through the gravel pack 116. As another example, an acoustic signal transmitted by the acoustic transceiver 512 may also be received by the acoustic transceivers 504, 514 through the gravel pack 116. As yet another example, acoustic signals transmitted by the acoustic transceiver 506 and the acoustic transceiver 510 may be received by the acoustic transceivers 508, 516 through the gravel pack 116. The acoustic transceivers 504, 508, 514, 516 may generate electrical signals from received acoustic signals in a similar manner as described above with respect to the FIGS. 1-4. In some example embodiments, the acoustic transceivers 504, 508, 514, 516, which may be accelerometers, may measure the vibration (e.g., ringing) in the screen 112, which can be related to the compressional forces exerted on and by the gravel-pack 116.

In some example embodiments, the wash pipe tool 204 may operate in a similar manner as described above to control the generation of acoustic signals by the acoustic transceivers 502, 506, 510, 512. For example, the wash pipe tool 204 may provide a command (e.g., an electrical signal) to the acoustic transceivers 502, 506, 510, 512 via an electrical cable that may be routed though or on the outside of the wash pipe 202. The wash pipe tool 204 may also provide power to the acoustic transceivers 502, 506, 510, 512 via the same or different electrical cable or via internal stored electrical energy (battery or capacitor). In some example embodiments, the wash pipe tool 204 may obtain/receive electrical signals via the inductive terminals 218 and a cable 520 in a similar manner as described with respect to FIGS. 2 and 4.

In some example embodiments, the wash pipe tool 204 may process electrical signals received from the acoustic transceivers 504, 508, 514, 516 and determine the porosity of the gravel pack 116 in a similar manner as described above. For example, the wash pipe tool 204 may determine travel times of acoustic signals through or mostly through gravel pack 116 if one or more of the acoustic transceivers 504, 508, 514, 516 receive an acoustic signal multiple times through different travel paths. The wash pipe tool 204 send an alert flag to the system controller 104, for example, via the cable 118 shown in FIG. 1 if the porosity of the gravel pack 116 is below a threshold porosity level (e.g., 40 porosity units). Alternatively, the wash pipe tool 204 may send the electrical signals received from the acoustic receivers 504, 508, 514, 516 to the system controller 104 or to another device for processing to determine the porosity of the gravel pack 116.

In some example embodiments, the acoustic transceivers may be spread along the entire length and circumference of the sand screen 112 such that the porosity of the gravel pack 116 that is around the entire sand screen 112 can be measured based on the travel times of acoustic signals through the gravel pack 116. In some example embodiments, the acoustic transceivers may be limited down to a single set situated at critical location(s) on the sand screen 112 and consisting of one or more focused transmitters and one or more receivers each isolated acoustically from the sand screen 112 such that the porosity of the gravel pack 116 that is around the sand screen 112 can be measured locally based directly on the compressional travel times of acoustic signals through the gravel pack 116 with a reduced requirement for complex signal processing, e.g., deconvolution, pattern recognition, etc. In some example embodiments, the system 500 may include more or fewer acoustic transceivers than shown. In some alternative embodiments, some of the acoustic transceivers of the system 500 may be acoustic transmitters, and the remaining acoustic transceivers may be acoustic receivers without departing from the scope of this disclosure. In example embodiments, the bottom of the wellbore 126 may be open-hole without departing from the scope of this disclosure.

Figure 6:
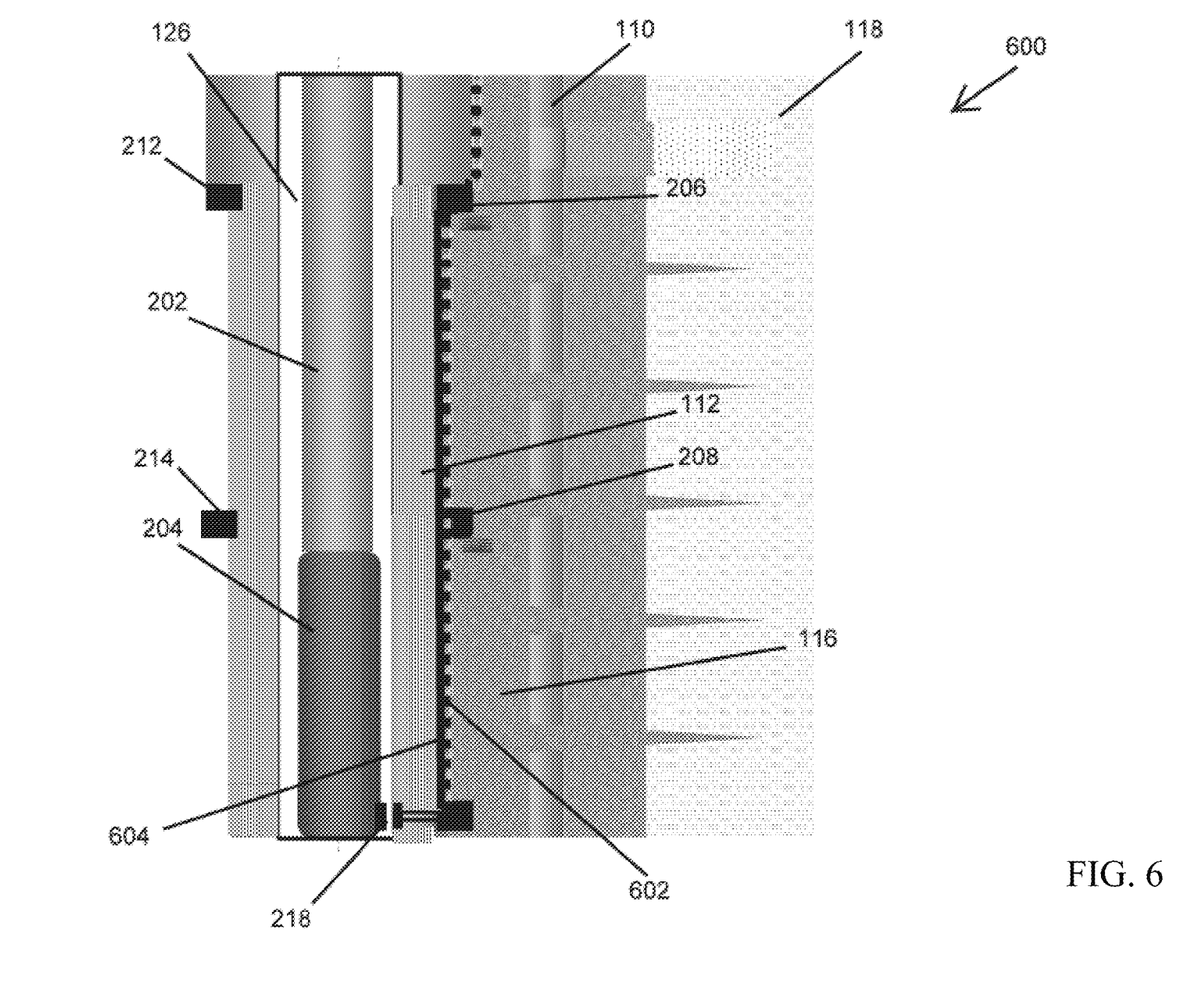
FIG. 6 illustrates a system for measuring the quality of a gravel pack prior to oil or gas production according to another example embodiment.

FIG. 6 illustrates a system 600 for measuring the quality of a gravel pack according to another example embodiment. The system 600 may be used for measuring gravel pack in carbon capture well, a water injection well, water producer well, oil well, a gas well, etc. as can be readily understood by those of ordinary skill in the art with the benefit of this disclosure. Referring to FIGS. 1, 2 and 6, in some example embodiments, the system 600 for measuring the quality of the gravel pack 116 may include an array of acoustic transducers including acoustic transceivers 206, 208, 212, 214. A respective sound dampening material may be placed between the individual acoustic transceivers 206, 208, 212, 214 and the sand screen 112 to dampen the transfer of sound between the acoustic transceivers 206, 208, 212, 214 and the sand screen 112. A sound dampening material may also be placed to dampen the transfer of sound between the acoustic transceivers 206, 208, 212, 214 and the casing 110. The acoustic transceivers 206, 208, 212, 214 may be attached to the sand screen 112 to transmit acoustic signals through the gravel pack 116. For example, the acoustic transceivers 206, 208, 212, 214 may be located on the side of the sand screen 112 facing the gravel pack 116.

In general, the acoustic transceivers 206, 208, 212, 214 may be spread across the length and circumference of the sand screen 112 such that an acoustic signal transmitted by an individual acoustic transceiver of the acoustic transceivers 206, 208, 212, 214 results in pressure being applied to an optical fiber 602 through the gravel pack 116. For example, the optical fiber 602 may include Bragg gratings that are located at intervals along the length of the optical fiber 602. The optical fiber 602 may be wrapped around the sand screen 112 along the length of the sand screen 112. Alternatively, the optical fiber 602 may extend along and around the sand screen 112 in a different configuration.

In some example embodiments, the acoustic transceivers 206, 208, 212, 214 may correspond to and operate in a similar manner as some of the acoustic transducers described above with respect to FIG. 2 except that the acoustic transceivers 206, 208, 212, 214 in the system 600 do not operate to receive acoustic signals through the gravel pack 116. To illustrate, the wash pipe tool 204 may control the generation of acoustic signals by the acoustic transceivers 206, 208, 212, 214 in a similar manner as described above with respect to FIG. 2. For example, the wash pipe tool 204 may send a command (e.g., an electrical signal) to each acoustic transceiver 206, 208, 212, 214 individually via an electrical cable 604 and the inductive terminals 218, and each acoustic transceiver 206, 208, 212, 214 may generate a respective acoustic waveform (e.g., a sinusoidal, a chirp, etc.) based on or from the respective command.

In some example embodiments, the acoustic signals generated by each acoustic transceiver 206, 208, 212, 214 may exert, through the gravel pack 116, pressures on sections of the optical fiber 602 at the sand screen 112. The exerted pressures may affect one or more dimensions of embedded Bragg gratings within the optical fiber 602 or directly the optical fiber 602 at the sand screen 112 such that characteristics of an optical signal traveling through the section of the optical fiber 602 is affected. To illustrate, the system controller 104 at the surface may transmit down an optical signal toward the sand screen 112 through the optical fiber 602. The transmitted optical signal may get reflected by the embedded Bragg gratings, and the reflected optical signals may travel back to the system controller 104 through the optical fiber 602. The pressures exerted by the acoustic signals on the optical fiber 602 through the volumes of the gravel pack 116 correspondingly affect characteristics (e.g., a wavelength) of the reflected optical signals. The reflected optical signals travel back up to the system controller 104 and may be processed by the system controller 104 or another device at the surface to determine the porosity of the gravel pack 116 based on the characteristics of the reflected optical signals.

For example, the system controller 104 may receive and record the reflected optical signals. The system controller 104 or another device at the platform 102 may determine the porosity of the gravel pack 116 based on the characteristics of the reflected optical signals as can be readily understood by those of ordinary skill in the art with the benefit of this disclosure. To illustrate, the amount of pressure exerted on the optical fiber 602 (i.e., on the embedded Bragg gratings) by an acoustic signal transmitted by each acoustic transceiver 206, 208, 212, 214 through the gravel pack 116 may correlate to the porosities of volumes of the gravel pack 116. The characteristics of the reflected optical signals (e.g., wavelengths) may correlate to the amount of pressure exerted on the optical fiber 602. Based on these correlations, the system controller 104 at the platform 104 or another device may determine the porosities of individual volumes of the gravel pack 116 and the overall porosity of the gravel pack 116.

In some example embodiments, the wash pipe tool 204 may provide power to the acoustic transceivers 206, 208, 212, 214. For example, the wash pipe tool 204 may include a power storage (e.g., a battery) as described above. Alternatively, power may be provided to the acoustic transceivers 206, 208, 212, 214 as well as other components of the system 600 by the system controller 104 or another device at the surface. In some example embodiments, after removal from the wellbore 126, the wash pipe tool 204 and the wash pipe 202 may be returned to the wellbore 126 (e.g., in the position shown in FIG. 6) to control the transmission of acoustic signals by the acoustic transceivers 206, 208, 212, 214 and other acoustic transceivers of the system 600 and to provide power (if needed) to the acoustic transceivers as described above.

In some example embodiments, the acoustic transceivers may be spread along the entire length and circumference of the sand screen 112 such that the porosity of the gravel pack 116 that is around the entire sand screen 112 can be measured based on the effect of acoustic signals on the optical fiber 602. In some example embodiments, the system 600 may include more or fewer acoustic transceivers than shown. In some alternative embodiments, at least some of the acoustic transceivers of the system 600 may be acoustic transmitters without departing from the scope of this disclosure. In some example embodiments, the bottom of the wellbore 126 may be open-hole without departing from the scope of this disclosure. In some example embodiments, the optical fiber 602 may not include Bragg gratings, and changes in the reflected optical signals may result from dimensional changes in sections of the optical fiber 602 caused by the pressures exerted by the acoustic signals traveling through the gravel pack 116.

Figure 7:
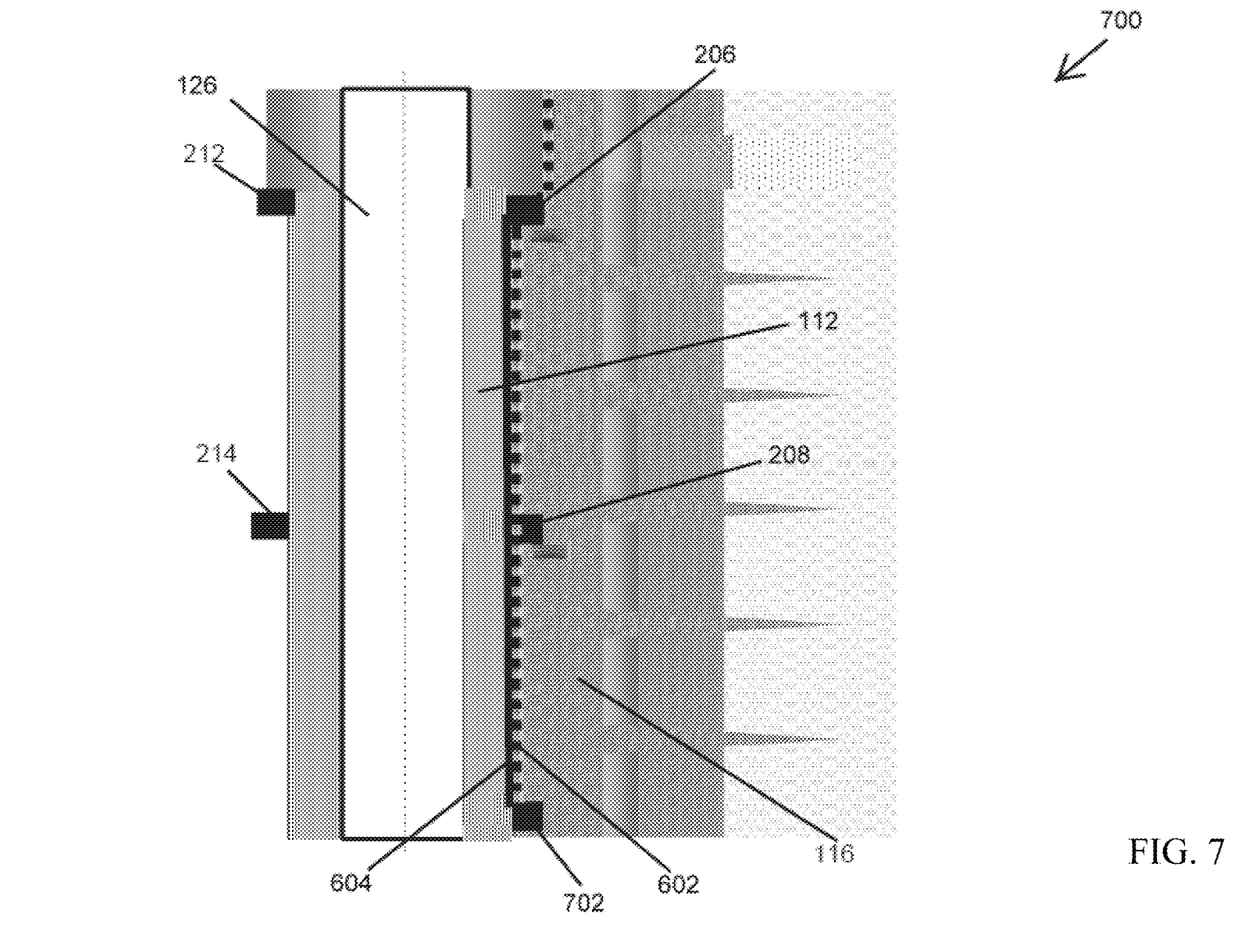
FIG. 7 illustrates a system for measuring the quality of a gravel pack according to another example embodiment.

FIG. 7 illustrates a system 700 for measuring the quality of a gravel pack according to another example embodiment. The system 700 may be used for measuring gravel pack in carbon capture well, a water injection well, water producer well, oil well, a gas well, etc. as can be readily understood by those of ordinary skill in the art with the benefit of this disclosure. Referring to FIGS. 1, 3, 6, and 7, in some example embodiments, the gravel pack quality measurement system 700 of FIG. 7 operates in a similar manner as the system 600 of FIG. 6. In contrast to the system 600, the system 700 does not include the wash pipe tool 204 that is attached to the wash pipe 202 shown in FIG. 6. Instead, the system 700 includes a control device 702 that may perform some of the functions described above with respect to the wash pipe tool 204. For example, the control device 702 may include a microprocessor/microcontroller, a memory device, etc. to perform some of the operations performed by the control device 702.

In some example embodiments, the system 700 includes an array of acoustic transceivers, including the acoustic transceivers 206, 208, 212, 214, that operate in a similar manner as described above with respect to FIG. 6. The control device 702 may control the generation of acoustic signals by at least some of the acoustic transceivers 206, 208, 212, 214 in a similar manner as described above with respect to the wash pipe tool 204 and FIG. 6. For example, the control device 702 may control the generation of acoustic signals one at a time by providing one or more commands (e.g., electrical signals) to the acoustic transceivers 206, 208, 212, 214 and other acoustic transceivers of the system 700 via the cable 604. The control device 702 may also provide power (e.g., from a battery of the control device 702) to the acoustic transceivers 206, 208, 212, 214 and other acoustic transceivers of the system 700. The control device 702 may itself operate using battery power. Alternatively, the control device 702 and the acoustic transceivers 206, 208, 212, 214 may be powered by another power source, such as a power source at the platform 102 or in the wellbore 126. For example, the control device 702 may receive power and commands from the surface wirelessly or via one or more wired connections. Alternatively, a power generation or storage mechanism that is at a different location in the wellbore 126 may provide power to the transducers and the control device 702.

In some example embodiments, the system controller 104 at the platform may transit an optical signal through the optical fiber 602 toward the sand screen 112 as described with respect to the system 600. The system controller 104 may also receive and process reflected optical signals at the platform as described with respect to FIG. 6. For example, the system controller 104 may determine the porosity (i.e., the gravel quality) of the gravel pack 116 based on the characteristics (e.g., wavelengths) of the reflected optical signals in the same manner as described with respect to the system 600. In some example embodiments, a device other than the system controller 104 may process the reflected optical signals to determine the porosity of the gravel pack 116.

In some example embodiments, the acoustic transceivers of the system 700 may be spread along the length and circumference of the sand screen 112 such that the porosity of the gravel pack 116 that is around the sand screen 112 can be measured based on the effect of acoustic signals on the optical fiber 602 (i.e., on the Bragg gratings of the optical fiber 602) in a similar manner as described with respect to the system 600 of FIG. 6.

In some example embodiments, the system 700 may include more or fewer acoustic transceivers than shown. In some alternative embodiments, at least some of the acoustic transceivers of the system 700 may be acoustic transmitters without departing from the scope of this disclosure. In some example embodiments, the bottom of the wellbore 126 may be open-hole without departing from the scope of this disclosure. In some alternative embodiments, the control device 702 may be at a different location (e.g., above or below the sand screen 112) than shown in FIG. 3 without departing from the scope of this disclosure. In some example embodiments, the optical fiber 602 may not include Bragg gratings, and changes in the reflected optical signals may result from dimensional changes in sections of the optical fiber 602 caused by the pressures exerted by the acoustic signals traveling through the gravel pack 116.

Although some of the systems shown in FIGS. 1-7 are described with respect to oil/gas wells, in some alternative embodiments, the systems may be used in other types of operations and wells such as a carbon capture well, a water injection well, water producer well, etc. as can be readily understood by those of ordinary skill in the art with the benefit of this disclosure.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures. One of ordinary skill in the art will appreciate that in the development of any such actual embodiment, numerous implementation-specific decisions must be made to achieve the developers' specific goals, such as compliance with system-related constraints, which will vary from one implementation to another. Moreover, it will be appreciated that such a development effort might be complex and time-consuming but would nevertheless be a routine undertaking for those of ordinary skill in the art having the benefit of this disclosure.

What is claimed is:

1. A system for measuring a porosity of a gravel pack in a wellbore, the system comprising:
    an optical fiber extending around a sand screen;
    an acoustic transducer configured to transmit an acoustic signal through a volume of the gravel pack such that the acoustic signal results in a pressure being exerted on a section of the optical fiber; and
    a system controller configured to transmit an optical signal into the optical fiber and receive reflected optical signals that result from reflections of the optical signal by the optical fiber, wherein the system controller is configured to determine the porosity of the gravel pack based on at least one or more characteristics of the reflected optical signals that are affected by the pressure exerted on the section of the optical fiber.

2. The system of claim 1, further comprising a control device configured to control a generation of the acoustic signal by the acoustic transducer.

3. The system of claim 2, wherein the control device is included in a wash pipe tool attached to a wash pipe.

4. The system of claim 1, further comprising a second acoustic transducer configured to transmit a second acoustic signal through a second volume of the gravel pack such that the second acoustic signal results in a second pressure being exerted on a second section of the optical fiber.

5. The system claim 4, wherein the optical fiber comprises a number of Bragg gratings.

6. The system of claim 5, wherein the system controller is configured to receive second reflected optical signals that result from reflections of the optical signal by the number of Bragg gratings and determine the porosity of the gravel pack further based on at least one or more characteristics of the second reflected optical signals that are affected by the second pressure exerted on the second section of the optical fiber.

7. The system of claim 1, wherein the optical fiber extending around the sand screen extends along a length of the sand screen.

8. The system of claim 1, wherein the optical fiber comprises a number of Bragg gratings.

9. The system of claim 1, wherein the acoustic transducer is attached to the sand screen.

10. The system of claim 1, wherein the acoustic transducer is located on an outside surface of the sand screen that faces the gravel pack.

11. The system of claim 2, wherein the control device provides a command to the acoustic transducer to generate the acoustic signal.

12. The system of claim 11, wherein the control device provides the command to the acoustic transducer via an inductive terminal coupled to a wash pipe.

13. The system of claim 1, wherein the at least one or more characteristics of the reflected optical signals that are affected by the pressure exerted on the section of the optical fiber include a wavelength of a plurality of wavelengths of the reflected optical signals.

* * * * *